United States Patent [19]
Gleim et al.

[11] 3,867,417
[45] Feb. 18, 1975

[54] VANADYL XANTHATES

[75] Inventors: William K. T. Gleim, Island Lake; Elmars Bremanis, Park Ridge, both of Ill.

[73] Assignee: Universal Oil Products Company, Des Plaines, Ill.

[22] Filed: Apr. 20, 1973

[21] Appl. No.: 353,047

[52] U.S. Cl. ............. 260/429 K, 208/251, 208/253, 260/429 R, 260/455 R
[51] Int. Cl. ............................................. C07f 9/00
[58] Field of Search .................... 260/429 R, 429 K

[56] References Cited
UNITED STATES PATENTS
1,440,962  1/1923  Cadwell .......................... 260/429 K
3,297,589  1/1967  Gleim ................................ 252/439

OTHER PUBLICATIONS

Gariyanov et al. Theoretical & Experimental Chem. vol 1, July–Aug. 1965 p. 345–347.
RAO Xanthates & Related Compounds, 1931 p. 18,19,24,25 Marcel Dekker N.Y., N.Y.

*Primary Examiner*—Arthur P. Demers
*Attorney, Agent, or Firm*—James R. Hoatson, Jr.; William H. Page II; Raymond H. Nelson

[57]  ABSTRACT

A novel compound comprising a vanadyl xanthate which is prepared by the reaction of an alkali xanthate with a vanadyl salt in the presence of an atmosphere comprising carbon dioxide.

6 Claims, No Drawings

VANADYL XANTHATES

This invention relates to a novel compound and to a method for the preparation thereof. More specifically, this invention relates to a process for preparing novel vanadyl xanthates which comprises the reaction of an alkali xanthate with a vanadyl salt in an atmosphere comprising carbon dioxide. It has been shown in the prior art that vanadium xanthate has been used as a hydrorefining catalyst which was prepared by impregnating a refractory inorganic oxide with a decomposable vanadium compound whereby the inorganic oxide was treated with a sulfurous compound containing chlorine and the resultant inorganic-vanadium composite was calcined. It has also been shown that various Group VB, VIB and the Iron Group of the Periodic Table have been utilized to form xanthate complexes for hydrorefining catalysts. A specific example of such complex would be a molybdenum ethylxanthate or a vanadium xanthate complex. The use of pure vanadium has also been shown as a hydrogenation catalyst in the purification of a crude petroleum oil, vacuum gas oil, or heavy cycle oil to convert asphaltenes and metal contaminants into compounds which are soluble in n-pentane and for the removal of nitrogenous and sulfurous contaminants in said charge stock.

In contradistinction to what has been taught in the prior art, it has now been discovered that when an alkali xanthate is reacted with a vanadyl salt in an atmosphere comprising carbon dioxide, a novel composition of matter is formed which comprises vanadyl xanthates. The composition of matter is novel in the fact that the radical [VO] commonly called vanadyl, has never been found to form a xanthate. The utilization of the novel composition of matter, namely the vanadyl xanthates, will enable the manufacturer or refiner to mitigate the cost of purification of crude oils as a result of the use of said vanadyl xanthates as a catalyst precursor for a process to convert asphaltenes and remove metallic impurities.

The desired products of the process of this invention, namely vanadyl xanthates, may be utilized in the chemical industry in many ways. For example, vanadyl xanthates may be utilized as catalysts or as catalyst precursors in the purification of crude oils from common metallic contaminants such as nickel, vanadium, iron, and copper, plus other contaminants comprising sulfurous and nitrogenous compounds. A specific example of a vanadyl xanthate is the utilization of vanadyl xanthate as a precursor to a catalyst comprising a molybdenum xanthate complex which is utilized in the purification of a crude oil.

It is therefore, an object of this invention to provide a process for the preparation of novel compounds comprising vanadyl xanthates.

A further object of this invention is to provide for a process for the preparation of vanadyl xanthates utilizing alkali xanthates and vanadyl salts which will permit the recovery of the desired compound in a more expedient manner.

In one aspect an embodiment of this invention resides in novel compounds comprising vanadyl xanthates having the following formula:

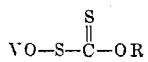

in which R is selected from a group comprising alkyl, aryl, cycloalkyl, substituted alkyl, substituted aryl, and substituted cycloalkyl radicals.

In another aspect an embodiment of this invention resides in a process for the preparation for a vanadyl xanthate which comprises reacting an alkali xanthate with vanadyl salt in an atmosphere comprising carbon dioxide at reaction conditions and recovering the resultant vanadyl xanthate.

A specific embodiment of this invention resides in vanadyl methylxanthate.

Another specific embodiment of this invention resides in vanadyl benzylxanthate.

Another specific embodiment of this invention resides in a process for preparing vanadyl ethylxanthate which comprises reacting vanadyl sulfate with potassium methylxanthate in an atmosphere of carbon dioxide at a temperature in the range of about $-10°C$ to about $30°C$ and a pressure of one atmosphere and recovering the resultant ethylxanthate.

Yet another specific embodiment of this invention resides in a process for preparing vanadyl benzylxanthate which comprises reacting vanadyl chloride with sodium benzylxanthate in an atmosphere of carbon dioxide at a temperature of about $10°C$ and a pressure of one atmosphere and recovering the resultant vanadyl benzylxanthate.

As hereinbefore set forth, the present invention is concerned with novel compounds comprising vanadyl xanthates, and for a process for the preparation thereof, said process being effected by reacting an alkali xanthate with a vanadyl salt in an atmosphere comprising carbon dioxide. The reaction is effected under conditions which include a temperature in the range of from $-10°C$ to about $30°C$, and preferably in a range of from about $0°C$ to about $10°C$. In addition, the pressure utilized during the preparation of the vanadyl xanthates is ambient pressure. Another variable which is employed is the amount of reactants, the alkali xanthate usually being present in an excess of the vanadyl salt and at least in a mol ratio of about 2:1 mols of alkali xanthate per mol of vanadyl salt.

Examples of suitable vanadyl salts which are utilized as one of the starting materials in the process of this invention include, the particular, vanadyl chloride, vanadyl bromide, vanadyl iodide, vanadyl sulfate, vanadyl phosphate, etc.

Suitable alkali xanthates which may be reacted with the aforementioned vanadyl salts will include lithium methylxanthate, potassium methylxanthate, sodium methylxanthate, lithium ethylxanthate, sodium ethylxanthate, potassium ethylxanthate, potassium propylxanthate, sodium butylxanthate, rubidium amylxanthate, lithium hexylxanthate, potassium heptylxanthate, sodium octylxanthate, rubidium octylxanthate, lithium benxylxanthate, etc. It is understood that the aforementioned vanadyl salts and alkali xanthates are only representative of the class of compounds which may be employed, and that the present invention is not necessarily limited thereto.

The preparation of the vanadyl xanthates comprises the reaction of the alkali xanthate with the vanadyl salt in an atmosphere comprising carbon dioxide. The carbon dioxide atmosphere serves a dual purpose in that it will inhibit any oxidation reactions while simultaneously creating an acidic reaction medium that is optimal for the formation of the vanadyl xanthate. It is contemplated within the generally broad scope of this invention that any other atmosphere may be utilized which will inhibit oxidation while creating an acidic medium although not necessarily with equivalent results.

The process of this invention may be effected in any suitable manner and may comprise either a batch or continuous type operation. For example, when a batch type operation is employed, the reactants comprising the vanadyl salt and an alkali xanthate are placed in appropriate apparatus containing an atmosphere comprising carbon dioxide. The reaction vessel is cooled to a predetermined operating temperature. After maintaining the reactants in the reaction vessel at this temperature for a time which may range from 0.5 up to about 20 hours or more in duration, cooling is discontinued and the vessel allowed to return to room temperature. The reaction mixture is then recovered and subjected to conventional means of purification and separation, said means including filtering, washing, drying and extraction, whereby the desired novel vanadyl xanthate is recovered.

It is also contemplated within the scope of this invention that the reaction process for obtaining the novel compound, vanadyl xanthate, may be effected in a continuous manner of operation. When such a type of operation is employed, the reactants are continuously charged to the reaction vessel containing an atmosphere comprising carbon dioxide, said vessel being maintained at proper operation conditions of temperature and pressure. After completion of the desired residence time, the reactor effluent is continuously withdrawn and subjected to conventional means of separation whereby the desired vanadyl xanthates are recovered, while any unreacted starting materials comprising the vanadyl salt and the alkali xanthate are recycled to the reaction zone to form a portion of the charge stock.

In addition, the vanadyl xanthates of the present invention comprise new compositions of matter possessing the formula

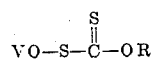

in which R is selected from a group comprising alkyl, aryl, cycloalkyl, substituted alkyl, substituted aryl and substituted cycloalkyl radicals which would include vanadyl methylxanthate, vanadyl ethylxanthate, vanadyl propylxanthate, vanadyl butylxanthate, vanadyl amylxanthate, vanadyl hexylxanthate, vanadyl heptylxanthate, vanadyl octylxanthate, vanadyl nonylxanthate, vanadyl decylxanthate, vanadyl benzylxanthate, vanadyl cyclohexylxanthate, vanadyl toluxanthate, vanadyl 2-methoxybutylxanthate, vanadyl 2,3-dimethoxyamylxanthate, vanadyl 1,2,3-tripropylnonylxanthate, vanadyl 1,2-dichloroamylxanthate, vanadyl 1,2,3-trichlorooctylxanthate, vanadyl 1,2-diphenylpropylxanthate, etc. It is to be understood that the aforementioned compounds are only representative of the class of compounds which may be prepared and the process of this invention is not necessarily limited thereto.

The following examples are given to illustrate the process of the present invention which, however, are not intended to limit the generally broad scope of the present invention in strict accordance therewith.

EXAMPLE I

In this example 16.3 grams (0.1 mol) of vanadyl sulfate are dissolved in 100 milliliters of water and placed in a flask provided with cooling and carbon dioxide entry devices. The flask is cooled to a temperature of 10°C and carbon dioxide is permitted to be bubbled through the solution at ambient pressure, at which time 24.8 grams (0.2 mol) of potassium methylxanthate are added. After 0.5 hours the cooling is discontinued and the flow of carbon dioxide terminated, thereby allowing the flask to return to room temperature. The product is recovered and analyzed by means of gas-liquid chromatography and infra-red spectroscopy instrumentation, said analysis discloses the presence of the desired and novel vanadyl methylxanthate.

EXAMPLE II

In this example, 11.7 grams (0.1 mol) of vanadyl acetate are dissolved in 100 milliliters of water and placed in a flask provided with cooling and carbon dioxide entry devices. The flask is cooled to a temperature of 20°C while carbon dioxide is permitted to be bubbled up through the solution, said solution being maintained at ambient pressure, at which time 32.0 grams (0.2 mol) of potassium ethylxanthate are added to the flask. After 1 hour the cooling is discontinued, the flow of carbon dioxide is terminated and the flask allowed to return to room temperature. The product is recovered and analyzed by means of gas-liquid chromatography and infra-red spectroscopy instrumentation, said analysis discloses the presence of the desired and novel vanadyl ethylxanthate.

EXAMPLE III

In this example, 13.7 grams (0.1 mol) of vanadyl chloride are dissolved in 100 milliliters of water and placed in a flask provided with cooling and carbon dioxide entry devices. The flask is cooled to a temperature of 15°C while carbon dioxide is allowed to be bubbled up through the solution, at which time 38.4 grams (0.2 mol) of sodium benzylxanthate are added to the flask. After 0.7 hours the cooling is discontinued, the flow of carbon dioxide is terminated and the flask allowed to return to room temperature. The product is recovered and analyzed by means of gas-liquid chromatography and infra-red spectroscopy instrumentation, said analysis discloses the presence of the desired novel vanadyl benzylxanthate.

EXAMPLE IV

In this example, 16.3 grams (0.1 mol) of vanadyl sulfate are dissolved in 100 milliliters of water and placed in a flask provided with cooling and carbon dioxide entry devices. The flask is cooled to a temperature of 5°C while carbon dioxide is allowed to be bubbled up through the solution, at which point 31.6 grams (0.2 mol) of sodium propylxanthate are added to the flask. After 0.5 hrs. the cooling is discontinued, the flow of carbon dioxide is terminated and the flask allowed to return to room temperature. The product is recovered and analyzed by means of gas-liquid chromatography and infra-red spectroscopy instrumentation, said analysis discloses the presence of the desired novel vanadyl propylxanthate.

We claim as our invention:

1. A process for the preparation of a vanadyl xanthate having the following formula:

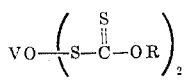

in which R is selected from the group consisting of methyl, ethyl, propyl, butyl, amyl, hexyl, heptyl, octyl, nonyl, decyl, cyclohexyl and benzyl radicals which comprises reacting an alkali xanthate wherein the xanthate moiety is selected from the group consisting of ethyl, propyl, butyl, amyl, hexyl, hephyl, octyl, nonyl, decyl, cyclohexyl and benzyl xanthate with a vanadyl salt in an oxygen-free atmosphere of carbon dioxide at reaction conditions and recovering the resulting vanadyl xanthate.

2. The process of claim 1 further characterized in that the reaction conditions include a temperature in the range of −10°C to about 30°C.

3. The process of claim 1 further characterized in that the vanadyl salt is vanadyl sulfate, the alkali xanthate is potassium methylxanthate and the resultant vanadyl xanthate is vanadyl methylxanthate.

4. The process of claim 1 further characterized in that the vanadyl salt is vanadyl chloride, the alkali xanthate is sodium benzylxanthate and the resultant vanadyl xanthate is vanadyl benzylxanthate.

5. The process of claim 1 further characterized in that the vanadyl salt is vanadyl acetate, the alkali xanthate is potassium ethylxanthate and the resultant vanadyl xanthate is vanadyl ethylxanthate.

6. The process of claim 1 further characterized in that the vanadyl salt is vanadyl sulfate, the alkali xanthate is sodium propylxanthate and the resultant vanadyl xanthate is vanadyl propylxanthate.

* * * * *